United States Patent

[11] 3,580,369

| [72] | Inventor | Burnette Heck |
| | | Bloomfield Hills, Mich. |
| [21] | Appl. No. | 837,097 |
| [22] | Filed | June 27, 1969 |
| [45] | Patented | May 25, 1971 |
| [73] | Assignee | General Motors Corporation |
| | | Detroit, Mich. |

[54] LIQUID-COOLED DISC BRAKE ASSEMBLY
4 Claims, 6 Drawing Figs.
[52] U.S. Cl. .................................................. 188/264,
192/113
[51] Int. Cl. ..................................................... F16d 65/84
[50] Field of Search.......................................... 188/264.2,
264.22, 264 P; 152/113.2

[56] References Cited
UNITED STATES PATENTS
| 2,940,549 | 6/1960 | Hause et al. | (188/264P)UX |
| 3,061,048 | 10/1962 | Alsobrooks et al. | (188/264P)UX |
| 3,071,210 | 1/1963 | Wrigley et al. | 188/264(.22)X |

*Primary Examiner*—George E. A. Halvosa
*Attorneys*—W. E. Finken and D. D. McGraw ABSTRACT: A brake having a sealed housing containing a disc pack for braking the wheel with which the brake assembly is associated. The brake has a wheel hub-driven pump which pumps cooling liquid radially inwardly through the disc pack and then to a heat exchanger arrangement including ballast tanks. The sealed assembly is fastened together with shear head bolts having a conical sealing head construction. The brake assembly is readily mountable on standard production wheel spindles by use of an adapter plate mounting bracket.

INVENTOR.
Burnette Heck
BY
D. D. McGraw
ATTORNEY

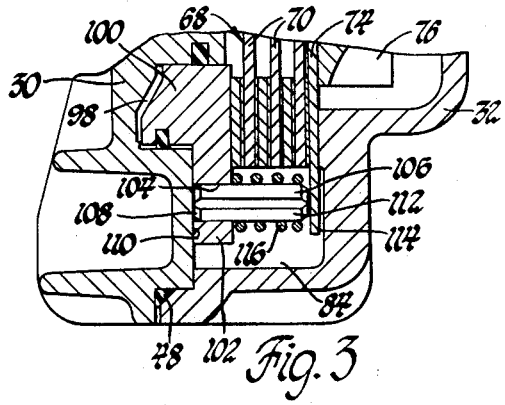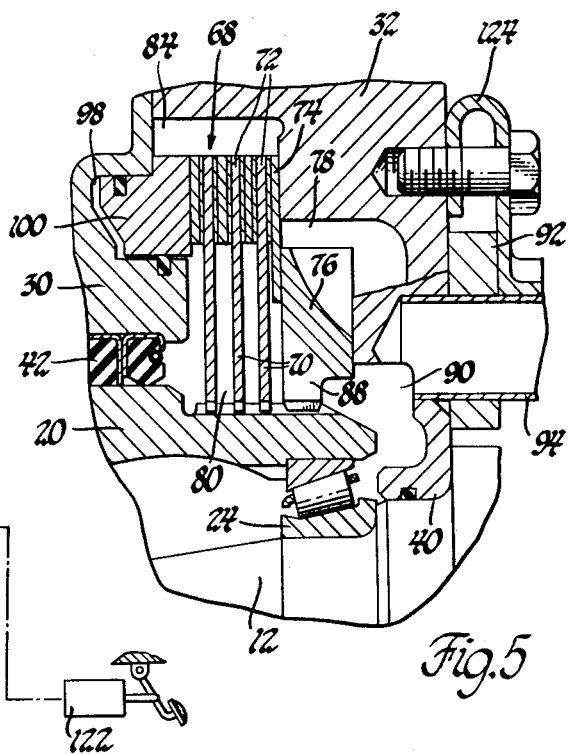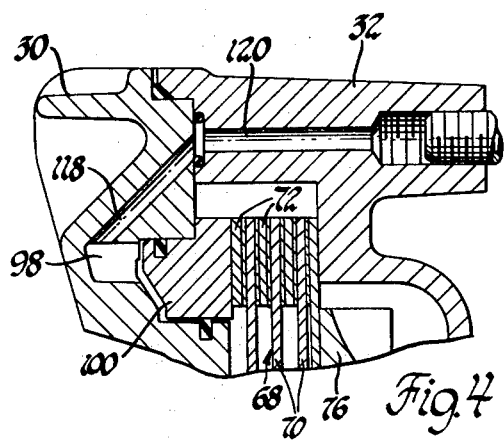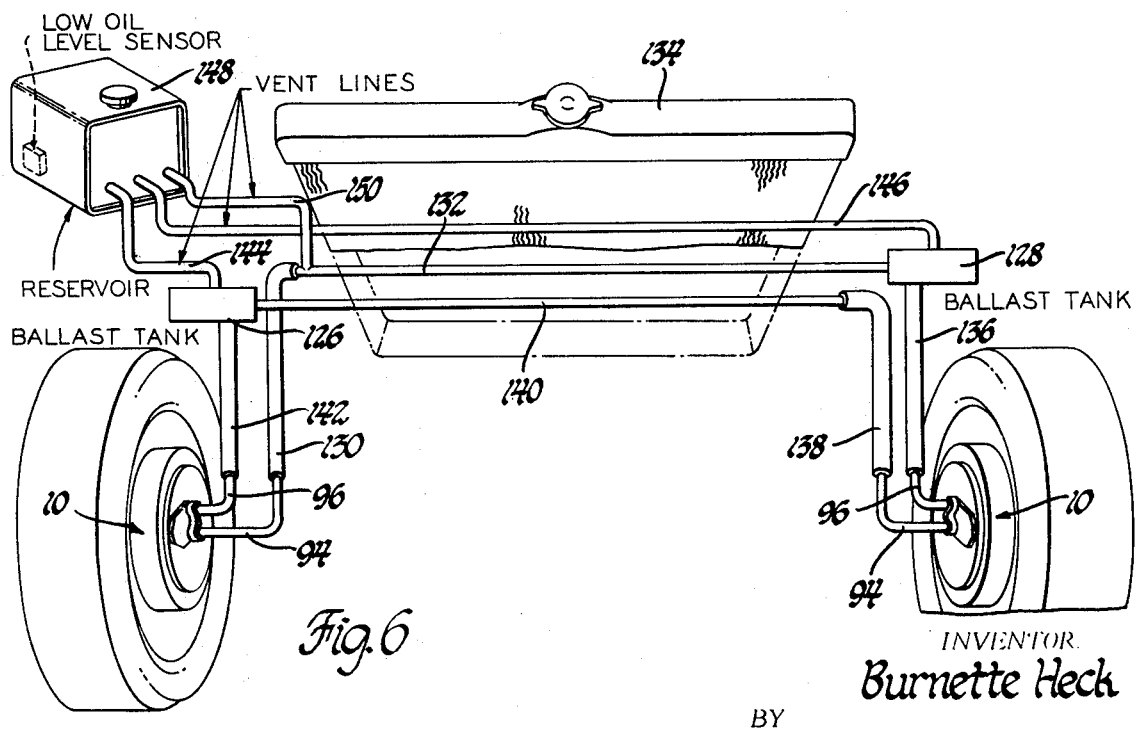

LIQUID-COOLED DISC BRAKE ASSEMBLY

The invention relates to a liquid-cooled disc brake, and more particularly, to one which has an interleaved disc brake pack through which cooled liquid is pumped by a wheel-driven pump contained in the brake housing, the cooling liquid passing inwardly through the disc pack. One of the annular plates forming a portion of the disc pack separates the pump inlet and outlet chambers so that it acts as a stripper, preventing pump fluid flow from bypassing the disc pack. The cooling liquid flows through the pump, radially inwardly of the impeller, after it has passed through the disc pack and is delivered to a pump outlet conduit connected to a heat exchanger system. Many portions of the brake are readily adapted for manufacture by aluminum die casting or by the use of other casting material such as nodular iron. The housing sections may be secured together by bolt fasteners of a type discouraging disassembly in the field, therefore preventing disassembly of the unit by persons unfamiliar with the requirements of assembly and the care that should be taken in repairing a liquid-cooled disc brake arrangement. The brake includes a simplified and effective adjusting mechanism utilizing a series of friction roll pins which cooperate with the brake apply piston and the brake housing and other portions of the brake to maintain sufficient clearance for nondragging operation when the brakes are released while permitting full brake energization with a small fluid displacement requirement.

IN THE DRAWINGS

FIG. 3 is a fragmentary cross section view of a portion of the mechanism of FIGS. 1 and 2 as taken in the direction of arrows 3-3 of FIG. 2.

FIG. 4 is a fragmentary cross section view of a portion of the mechanism of FIGS. 1 and 2 taken in the direction of arrows 4-4 of FIG. 2, and schematically includes a connection of the brake to a master cylinder.

FIG. 5 is a fragmentary cross section view of a portion of the mechanism of FIGS. 1 and 2, taken in the direction of arrows 5-5 of FIG. 2.

FIG. 6 is a schematic illustration of the installation of two such brakes in a vehicle and illustrates a heat exchanger arrangement for use with such brakes.

Figure 1:
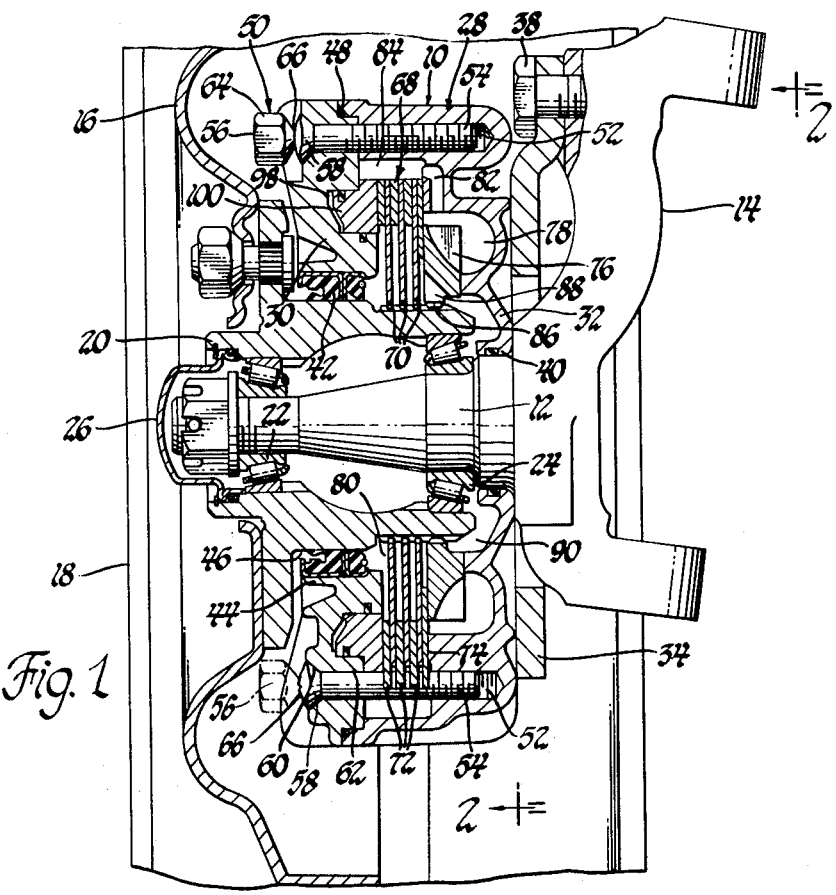
FIG. 1 is a cross section view of a brake embodying the invention as installed on the front wheel of a vehicle, portions of the illustrated mechanism being broken away.

The brake assembly 10 of FIG. 1 is mounted on the spindle 12 of the steering knuckle 14 of a vehicle. The wheel 16 provides a mounting for the tire 18 and is secured to the wheel hub 20. The hub is mounted on suitable bearing assemblies 22 and 24 which are in turn mounted on the spindle 12. The outer end of the hub 20 is sealed by means of the cap 26.

The brake assembly 10 includes a housing 28 having an outer section 30 and an inner section 32, the outer section 30 being on the side of the assembly toward the outside of the vehicle and the inner section 32 being on the side toward the inner or center portion of the vehicle. The housing 28 is mounted on a mounting bracket or adapter plate 34 by suitable bolts 36, and the mounting bracket 34 is in turn mounted on the steering knuckle 14 by suitable bolts 38. By providing this mounting arrangement, the brake assembly may be installed on vehicle steering knuckles of a current production type. In some instances, the mounting bracket 34 may be eliminated by designing the mounting arrangement so that the brake assembly can be secured directly to knuckle 14. The housing inner section 32 is sealingly positioned at its inner annulus 40 on a portion of the spindle 12. The housing outer section 30 has a seal assembly 42 at its inner annulus 44 which seals against a suitable surface 46 formed on the hub 20. Therefore, the housing 28, the hub 20, the spindle 12 and the cap 26 cooperate to define a series of interconnected sealing chambers. These chambers contain cooling liquid for the brake which also acts as a lubricant for the bearings and seals.

Housing inner and outer sections 30 and 32 are joined at a split line at their outer periphery with a suitable seal 48 being positioned to prevent leakage through the split line. The housing sections are fastened together by use of the shear head bolts 50. The housing inner section 32 has threaded recesses 52 into which the threaded ends 54 of the bolts 50 are tightened. The heads 56 of the bolts are formed in sections with the inner section 58 being conically shaped to meet with similar conically shaped seats 60 provided at the lower ends of the bolt receiving apertures 62 formed in the housing outer section 30 in alignment with the housing inner section threaded recesses 52. In order to provide a seal at the seats 60, the conical angle of the bolt inner sections 58 is slightly less than the conical angle of the seats 50. This causes a tightening contact adjacent the inner end of each of the seats. As the bolts are tightened, this contact increases, effectively sealing the bolt apertures against leakage. The bolt head 56 is also provided with an outer section 64 connected to the inner section 58 by a shear section 66. The outer section or head portion 64 is designed to provide a purchase for a tool, while the inner section 58 is not provided with a tool removal purchase surface. Typically, the outer bolt head section 64 is hexagonal while the inner section 58 is a flatly rounded section. The shear section 66 is designed to shear in a predetermined torque range when the bolt is tightened, so that the head outer section 56 is removed and the portion of the bolt remaining in the housing provides no tool removal purchase surface. Therefore, the bolts cannot be encouraged removed and persons working on the brake are Encouraged to replace the brake assembly 10 as a unit, therefore permitting close control over the quality of the brake parts and workmanship when the brake assembly is repaired. This is particularly important in brakes of this type with regard to the lining material used in the disc pack, the metal alloys used in the other friction surfaces, the tolerances of the parts, and the care that must be taken in repairing such a unit.

Figure 2:
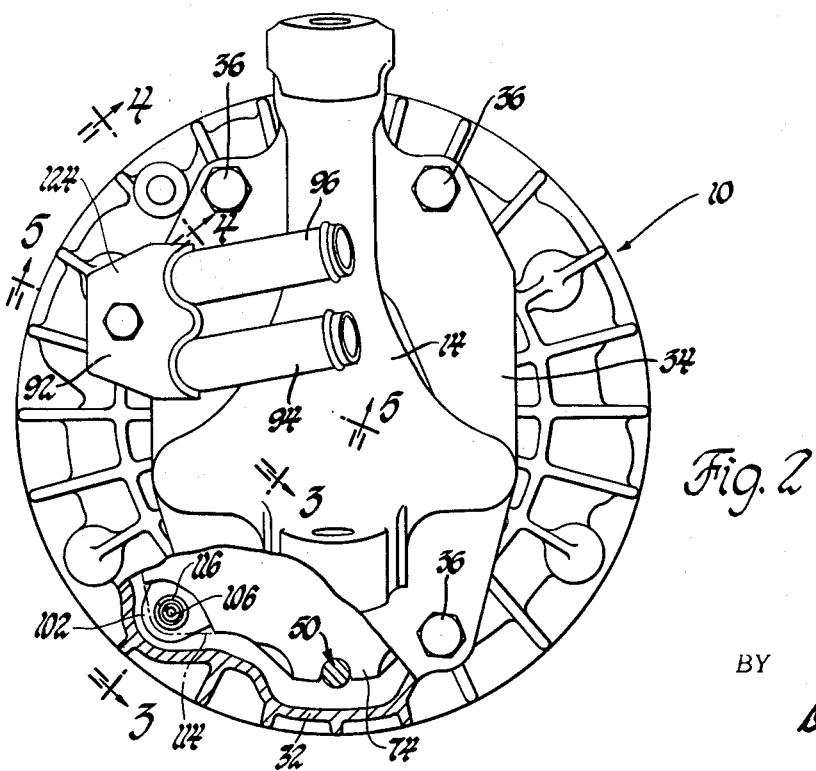
FIG. 2 is an elevation view, with parts broken away and in section, of the mechanism of FIG. 1 as taken in the direction of arrows 2-2 of that figure.

The disc pack 68 includes rotatable discs 70 splined on the hub 20 and interleaved with stationary discs 72, which are provided with suitable apertures and extensions, as better seen in FIG. 2, to engage the bolts 50 at their outer peripheries. An annular stationary disc 74 is provided as one of the stationary discs 72 and is adjacent the inner sidewall of the housing inner section 32. A cooling liquid pump 76 is also splined to hub 20 and is positioned intermediate the stationary disc 74 and a portion of the housing inner section 32 and within a toroidal pump chamber 78 formed in housing section 32. The pump 76 is a single cusp impeller rotating in the toroidal pump chamber, with the outer periphery of the pump engaging the annular stationary disc 74 to prevent cooling liquid leaving the pump from passing into the brake outlet chamber 80 instead of going through the pump outlet passage 82 and into the brake inlet chamber 84. Chamber 84 is within the housing 28 and is radially outward of the disc pack 68, while chamber 80 is radially inward of the friction surfaces of the disc pack 68. Thus, the annular stationary disc 74 directs cooling liquid flow from the pump to the outer side of the disc pack so that cooling liquid is forced to flow radially inwardly through the pack. This prevents the disc elements from acting as pumps which pump cooling liquid outwardly with a resultant tendency to cause poor distribution of cooling liquid in the disc pack.

The inner peripheral portion 86 of pump 76 has peripherally spaced splined sections separated by cooling liquid outlet passages 88 which conduct the heated liquid from the brake outlet chamber 80 to the chamber 90 and then to the pump manifold 92, suitably secured to the housing section 32, and to the pump outlet line 94. The pump manifold 92 also has a pump inlet line 96 which goes through the manifold to the pump chamber 78. The inlet line 96 receives cooled liquid from the heat exchanger system, and the outlet line 94 delivers heated liquid to the heat exchanger system.

The housing outer section 30 has an annular pressure chamber 98 formed therein which receives the annular piston 100 which is moved outwardly to compress the disc pack 68 to energize the brake. Piston 100 is furnished with outer peripheral extensions 102 which also fit about bolts 50 to guide and prevent rotation of the piston.

Extensions 102 of piston 100 also provide a mounting for the brake-adjusting mechanisms, one of which is illustrated in detail in FIG. 3. One such extension will be described, although several such extensions and adjusting mechanisms are provided in a circumferentially spaced arrangement. Extension 102 has an aperture 104 extending in the direction of the movement of the piston and receiving a roll pin 106 therein in a tight friction relation such that the pin will hold its position in the aperture and, therefore, relative to the piston until forced to move in the aperture. The end 108 of the pin may abut the surface 110 formed on the housing outer section 30 outwardly of the chamber 98. The other end of 112 of pin 106 extends through the brake inlet chamber 84 with a suitable clearance, e.g. about 0.010 inch, from disc 74. Upon sufficient movement of the piston 100, pin 106 is engageable with the annular stationary disc 74, which is provided with suitable extensions 114 for this purpose. The amount of movement required to engage the roll pin in 112 with an extension 114 is somewhat greater than the movement required to fully apply the brakes because of compression of the disc pack. A compression spring 116 is received about pin 106 and has one end abutting piston extension 102 and the other end abutting disc extension 114. Thus, the spring 116 urges piston 100 in a brake-releasing direction until the end 108 of pin 106 engages the abutting surface 110. As the brake linings wear and the overall thickness of the disc pack decreases, enough movement of the piston 100 occurs to cause the friction between pin 106 and aperture 104 to be overcome so that the piston moves toward disc 74 relative to the pin. This causes the pin end 108 to extend outwardly from the piston extension 102, thereby preventing the piston 100 from retracting as far as it had previously done. This arrangement, therefore, maintains an effective adjustment of the brake.

The portion of the brake illustrated in FIG. 4 shows the passages 118 and 120 respectively formed in the housing outer section 30 and inner section 32 and interconnecting pressure chamber 98, and the pressurizing circuit schematically illustrated as being connected to the vehicle master cylinder 122.

FIG. 5 shows in greater detail the portion of the annular stationary disc 74 in relation to the housing inner section 32 and the pump 76. It also shows in greater detail the outlet passages 88 of the pump and the connection of the pump outlet line 94 with the chamber 90. It illustrates the retaining mechanism 124 for the pump manifold 92.

The heat exchanger system is schematically illustrated in FIG. 6 and is similar to the system disclosed and claimed in U.S. application, Ser. No. 829,572 filed on June 2, 1969 by Donald W. Reynolds, and assigned to the common assignee. However, in the system herein disclosed separate ballast tanks 126 and 128 are used for each brake. Referring now to the connection of the brake assembly 10 shown on the left side of FIG. 6, the pump outlet line 94 is connected to a conduit 130 which leads to a conduit 132 extending through the cold portion of the vehicle radiator 134. Thus, heat is removed from the cooling liquid as it passes through conduit 132. Suitable fins may be provided on the conduits extending through the radiator to accelerate the heat removal. Conduit 132 is connected to the ballast tank 128 for the brake assembly 10 shown on the right side of FIG. 6. The ballast tank 128 is connected to the right brake assembly 10 through conduit 136 and the brake pump inlet line 96. Similarly, the right brake assembly 10 has its pump outlet 94 connected through conduit 138 to conduit 140, which also is positioned in the vehicle radiator cold section to cool the heated fluid passing therethrough. Conduit 140 is then connected to ballast tank 126, which is in turn connected through conduit 142 to the pump inlet line 96 of the left brake assembly 10. Ballast tanks 126 and 128 are respectively connected by vent lines 144 and 146 to the cooling liquid reservoir 148. A vent line 150 is also connected to the outlet from one of the brake assemblies, and is illustrated as being connected between conduits 130 and 132. The vent lines provide for expansion and contraction of the cooling liquid, its replacement, if necessary, and a means for escape of any entrapped air. The ballast tanks also provide for sufficient cooling liquid to prevent the circulation of heated cooling liquid from one brake to the other brake during a single stop.

I claim:

1. A liquid-cooled disc brake comprising:
   a wheel hub rotatably mountable on a support member,
   a brake housing mountable on said support member and receiving said hub in liquid sealing relation,
   a disc brake pack with interleaved rotating discs rotatably driven by said hub and stationary discs mounted in said housing,
   means for selectively engaging said discs in friction braking relation,
   a cooling liquid radial impeller pump driven by said hub and mounted in said housing and having an inlet line for receiving cooling liquid from and an outlet line for delivering cooling liquid to suitable heat exchanger means,
   pump outlet pressure passage means formed in said housing and delivering cooling liquid from said pump to a brake inlet chamber located in said housing radially outward of said disc pack,
   a brake outlet chamber radially inward of the friction braking surfaces of said disc pack receiving cooling liquid from said brake inlet chamber by radially inward flow of brake cooling liquid through said disc pack,
   passage means formed at least in part through said pump radially inwardly of the pump impeller and connecting said brake outlet chamber and said pump outlet line,
   and an annular stationary disc forming a part of said disc pack and extending radially adjacent said pump separating the pump outlet pressure area and the pump inlet pressure area from said brake outlet chamber,
   said pump and said inlet line and said outlet line all being positioned on one side of said disc brake pack.

2. The liquid-cooled disc brake of claim 1,
   said pump being a single cusp impeller rotating in a toroidal pump chamber formed in said housing with said annular stationary disc extending radially to cover one side of said toroidal pump chamber.

3. The liquid-cooled disc brake of claim 1,
   said pump having spaced splined areas on the inner periphery thereof mating with splines on said hub, the spaces between said splined areas providing a part of said passage means connecting said brake outlet chamber and said pump outlet line.

4. The liquid-cooled disc brake of claim 1,
   further comprising an annular piston movable by pressure in a chamber formed in said housing to actuate said brake,
   piston-retracting and -adjusting means including a split pin extending through a hole formed in a part of said piston extending radially outward beyond the braking surfaces of said disc pack, said pin extending over the periphery of the braking surfaces of said disc pack and engageable with a radially extended part of said annular stationary disc with one pin end,
   a compression spring receiving said pin therethrough and acting on said piston and said stationary disc to urge them apart, the pin being frictionally fitted but movable in said hole relative to said piston by movement of said piston in a brake applying direction beyond the movement required to engage the one end of said pin with said annular stationary disc, the other end of said pin abutting a surface of said housing upon retracting movement of said spring to establish a new adjusted piston retracted position as brake wear occurs.